(12) United States Patent
Yasui

(10) Patent No.: US 10,393,518 B2
(45) Date of Patent: Aug. 27, 2019

(54) APPARATUS FOR DETECTING FLOOR-TO-FLOOR HEIGHT OF BUILDING, METHOD FOR CONTROLLING THE SAME, AND STORAGE MEDIUM

(71) Applicant: CANON KABUSHIKI KAISHA, Tokyo (JP)

(72) Inventor: Airi Yasui, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 252 days.

(21) Appl. No.: 14/957,279

(22) Filed: Dec. 2, 2015

(65) Prior Publication Data

US 2016/0161252 A1 Jun. 9, 2016

(30) Foreign Application Priority Data

Dec. 9, 2014 (JP) .................................. 2014-249433

(51) Int. Cl.
| | |
|---|---|
| *G01C 5/06* | (2006.01) |
| *G01S 19/51* | (2010.01) |
| *G01C 21/00* | (2006.01) |
| *G01C 21/20* | (2006.01) |
| *G01S 19/39* | (2010.01) |

(52) U.S. Cl.
CPC .............. *G01C 5/06* (2013.01); *G01C 21/206* (2013.01); *G01S 19/39* (2013.01); *G01S 19/51* (2013.01); *G01C 21/00* (2013.01)

(58) Field of Classification Search
CPC .......... G01C 5/06; G01C 21/206; G01S 19/39
See application file for complete search history.

(56) References Cited

U.S. PATENT DOCUMENTS

| | | | | |
|---|---|---|---|---|
| 2006/0100782 A1* | 5/2006 | Levi | ......................... | G01C 5/06 |
| | | | | 701/468 |
| 2013/0151139 A1* | 6/2013 | Park | ...................... | G01C 21/16 |
| | | | | 701/410 |
| 2013/0332106 A1* | 12/2013 | Karvounis | ............... | G01C 5/00 |
| | | | | 702/141 |
| 2015/0127259 A1* | 5/2015 | Kazemipur | ............ | G01C 21/00 |
| | | | | 701/541 |

FOREIGN PATENT DOCUMENTS

| | | |
|---|---|---|
| JP | 2002-286492 A | 10/2002 |
| JP | 2009-281741 A | 12/2009 |

* cited by examiner

*Primary Examiner* — Sujoy K Kundu
*Assistant Examiner* — L. Anderson
(74) *Attorney, Agent, or Firm* — Canon U.S.A., Inc. I.P. Division

(57) ABSTRACT

An apparatus includes a height information acquisition unit configured to acquire information corresponding to a height at which the apparatus is present, a state specification unit configured to specify at least that the apparatus is in a first state where the apparatus starts moving up or down, and that the apparatus is in a second state where the apparatus finishes moving up or down, a detection unit configured to detect, based on a transition of the specified state of the apparatus, that the apparatus performs moving up or down corresponding to one floor in a building having one or more floors, and an estimation unit configured to estimate, based on the information acquired during the moving up or down corresponding to the one floor, a floor-to-floor height of the building having the one or more floors where the apparatus is present.

18 Claims, 10 Drawing Sheets

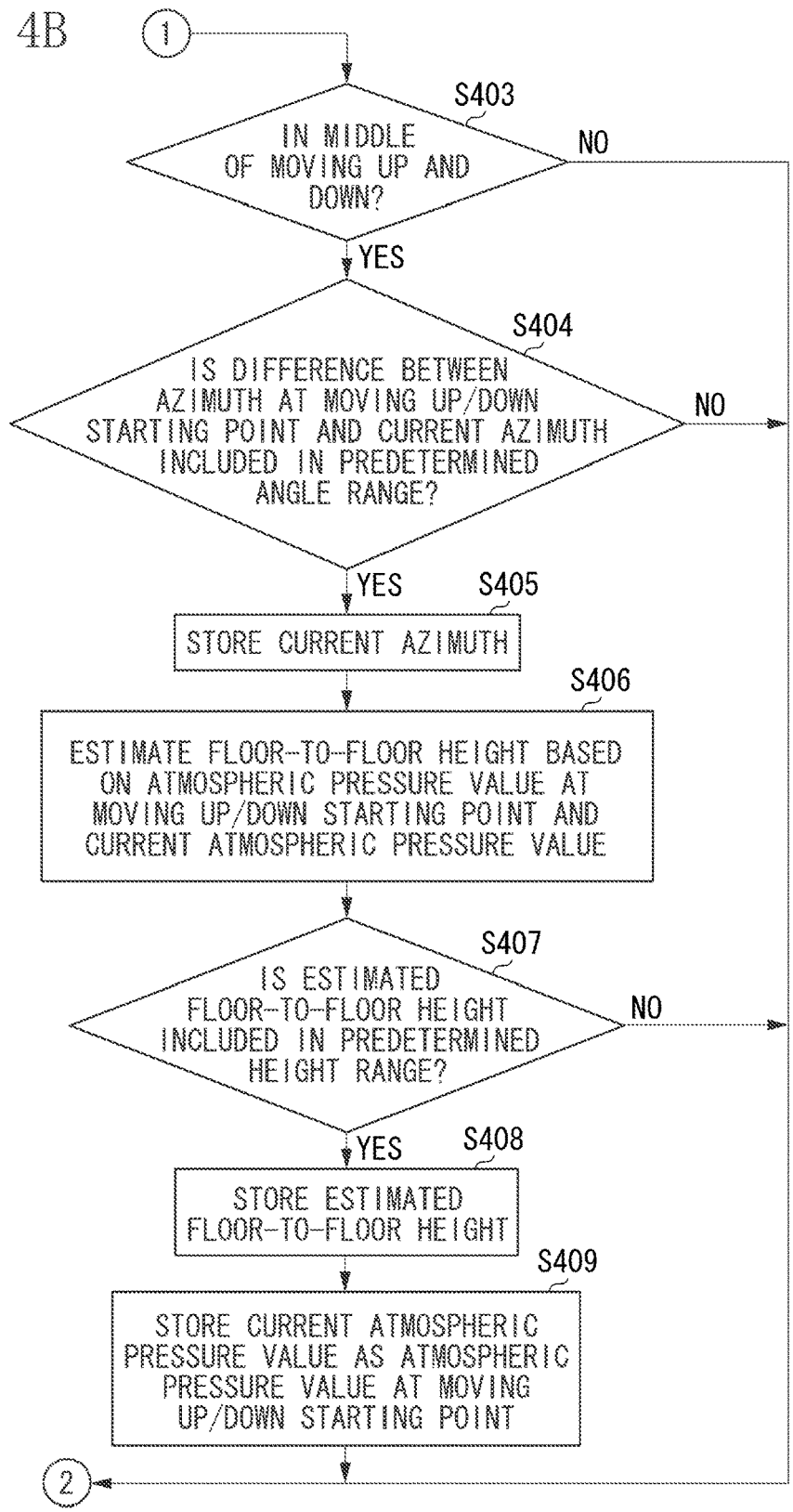

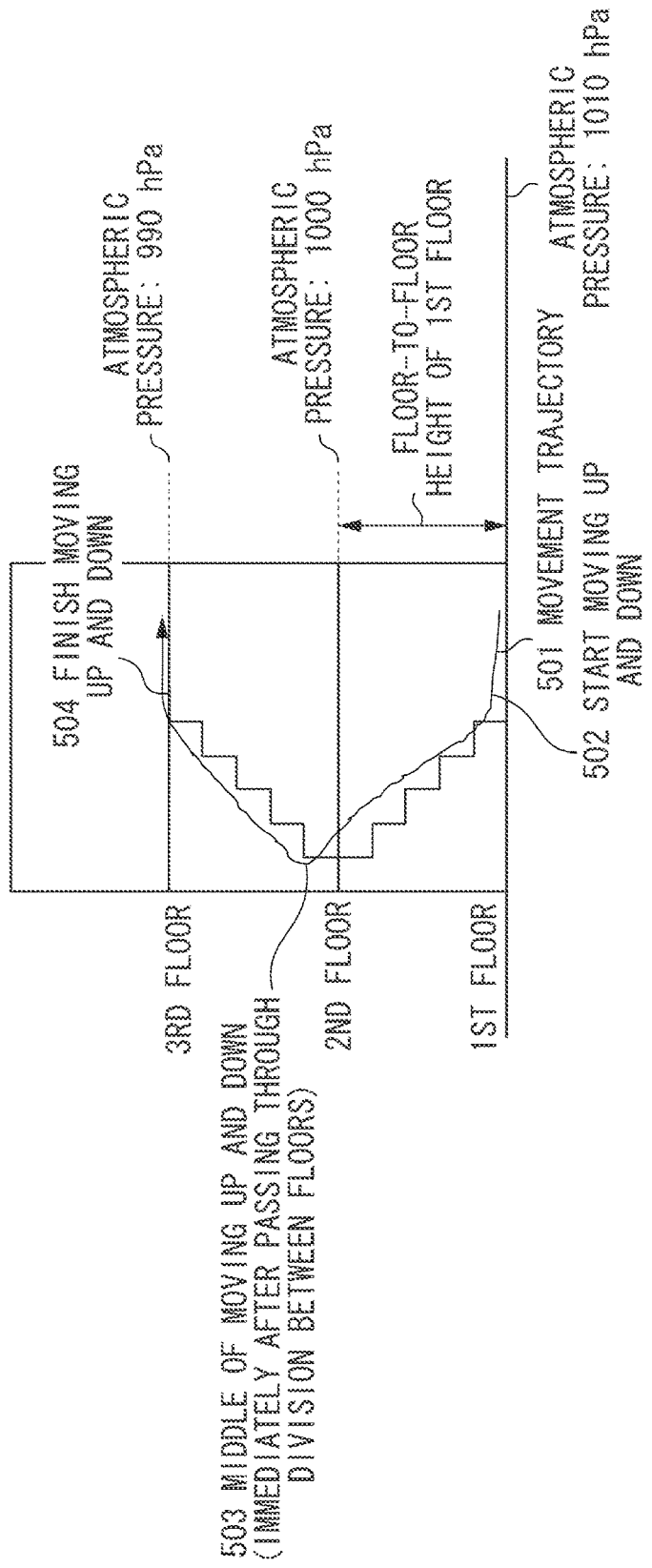

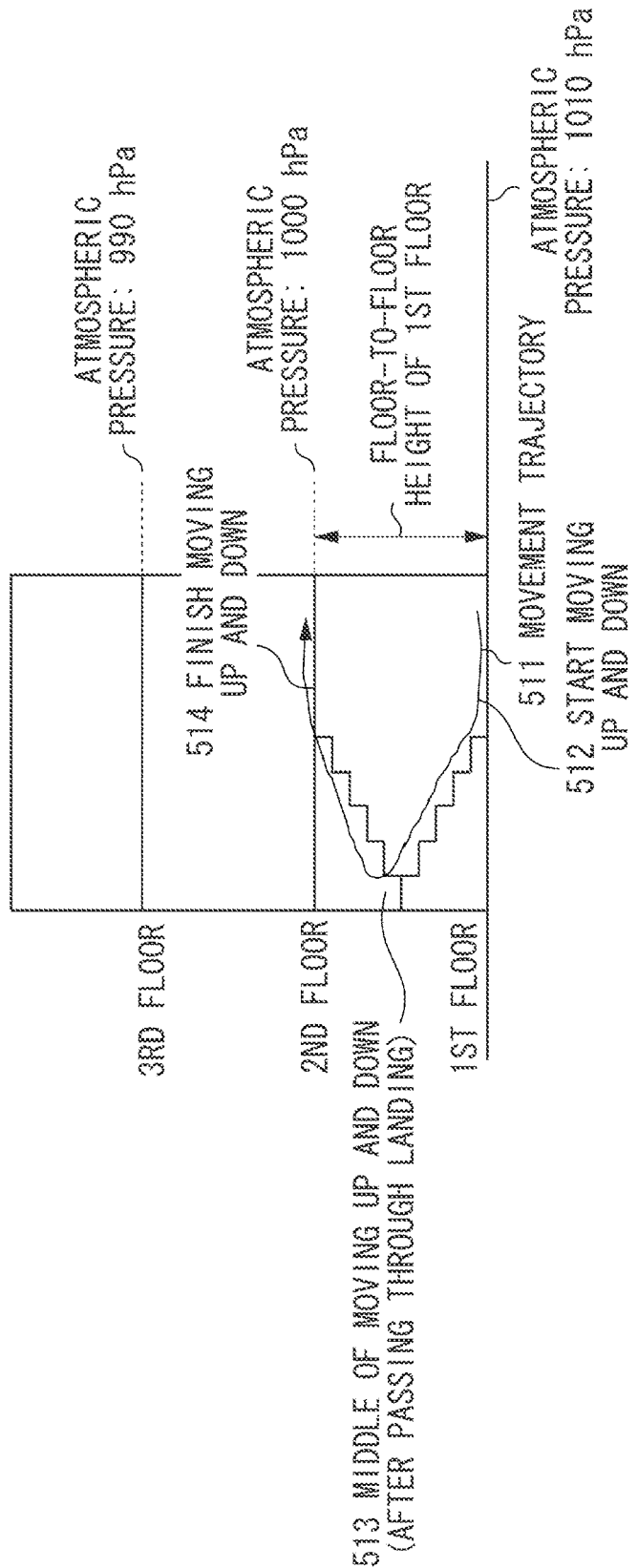

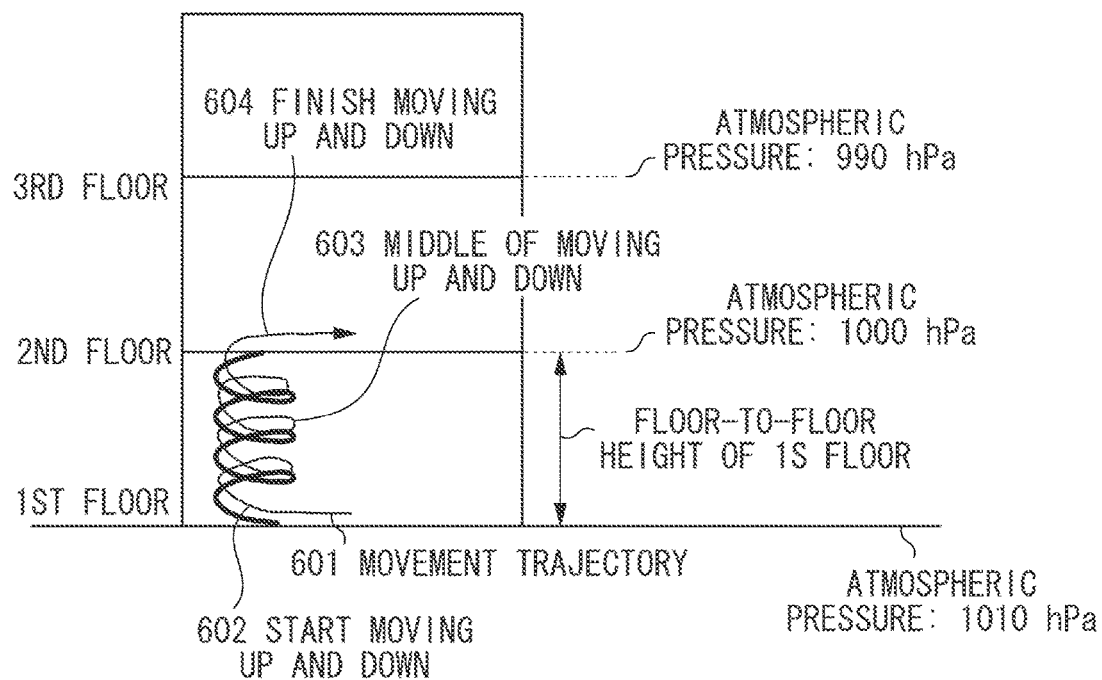

APPARATUS FOR DETECTING FLOOR-TO-FLOOR HEIGHT OF BUILDING, METHOD FOR CONTROLLING THE SAME, AND STORAGE MEDIUM

BACKGROUND OF THE INVENTION

Field of the Invention

The present disclosure relates to a technique for estimating height information using a sensor.

Description of the Related Art

There has been discussed a technique for acquiring a sensor value, obtaining, using an atmospheric pressure value and an elevation, a height (hereinafter referred to as a "relative height") from a height of a floor as a reference for obtaining a height of a building (hereinafter referred to as a "reference height") to a height of a floor on which a user is present in the building, and determining the floor number of the floor on which the user is present.

In Japanese Patent Application Laid-Open No. 2002-286492, the floor number of a floor on which a user is currently present in a building is calculated using information about a height obtained from a barometer or a GPS signal and the calculated floor number is displayed.

In order to obtain, using an atmospheric pressure sensor or a GPS signal, the floor number of a floor on which a user is currently present in a building, it is necessary to acquire a height of each floor in the building (referred to as a "floor-to-floor height"). In Japanese Patent Application Laid-Open No. 2002-286492, an information processing apparatus stores floor-to-floor height information of a building in advance. Then, when the floor number of the floor on which the user is currently present is obtained, the floor-to-floor height information stored in the information processing apparatus is acquired. The floor-to-floor height, however, is different depending on buildings, or depending on floors even in one building. Thus, it is difficult to examine the floor-to-floor heights of all buildings and store floor-to-floor height data in advance in a storage device. Further, there has been discussed a method for causing a user to explicitly input a floor-to-floor height every time the user moves from a floor to a floor. This method, however, may be bothersome for the user.

SUMMARY OF THE INVENTION

According to an aspect of the present disclosure, an apparatus includes a height information acquisition unit configured to acquire information corresponding to a height at which the apparatus is present, a state specification unit configured to specify, based on a change in the information acquired by the height information acquisition unit, at least that the apparatus is in a first state where the apparatus starts moving up or down, and that the apparatus is in a second state where the apparatus finishes moving up or down, a detection unit configured to detect, based on a transition of a state of the apparatus specified by the state specification unit, that the apparatus performs moving up or down corresponding to one floor in a building having one or more floors, and an estimation unit configured to estimate, based on the information acquired by the height information acquisition unit during the moving up or down corresponding to the one floor detected by the detection unit, a floor-to-floor height of the building having the one or more floors where the apparatus is present.

According to other aspects of the present disclosure, one or more additional apparatuses for detecting floor-to-floor height of building, one or more methods for controlling the same, and one or more storage mediums are discussed herein. Further features of the present disclosure will become apparent from the following description of exemplary embodiments with reference to the attached drawings.

BRIEF DESCRIPTION OF THE DRAWINGS

FIGS. 5A and 5B are schematic diagrams each illustrating an example of a state where the user carries the information processing apparatus.

FIG. 6A is a schematic diagram illustrating an example of a state where the user carries the information processing apparatus. FIG. 6B is a table illustrating an example of a detected azimuth.

DESCRIPTION OF THE EMBODIMENTS

Exemplary embodiments of the present disclosure will be described below with reference to the drawings. Components described in the exemplary embodiments, however, are merely illustrative, and are not intended to limit the scope of the present disclosure to them only.

In a first exemplary embodiment, the moving up and down of a user having an information processing apparatus is detected using a sensor, and based on the detection result, the height of one floor of a building where the user is present is estimated. In the specification, the height of one floor will hereinafter be referred to as a "floor-to-floor height". The floor-to-floor height is also occasionally termed an "increment floor" or simply termed a "floor height". Particularly, an example is described in which, in a building where it is difficult to acquire information of the height direction using a Global Positioning System (GPS) signal, the floor-to-floor height is specified using an atmospheric pressure sensor.

Figure 1A:
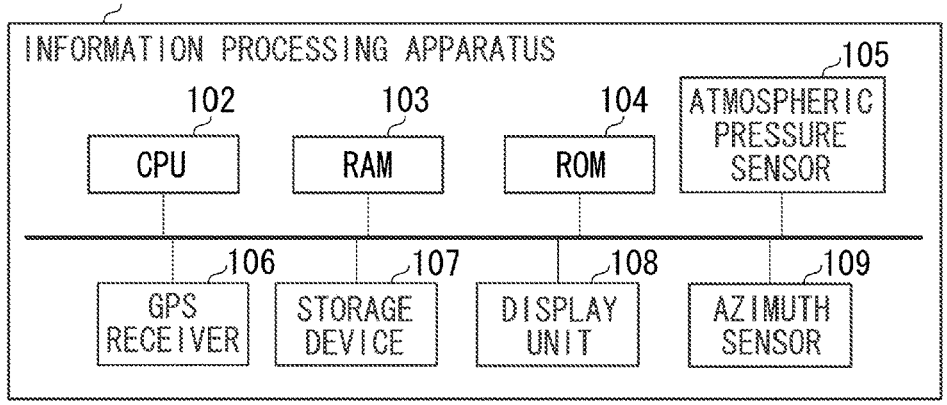
FIGS. 1A, 1B, and 1C are diagrams illustrating hardware and functional configurations of an information processing apparatus.

FIG. 1A is a configuration diagram illustrating a hardware configuration of an information processing apparatus 101. The information processing apparatus 101 is a terminal carried by a user, such as a smartphone. On the information processing apparatus 101, various sensors are mounted. A central processing unit (CPU) 102 performs calculations and logical determinations for various processes and controls each component connected to a system bus. The information processing apparatus 101 includes memories including a program memory and a data memory. A random-access memory (RAM) 103 is a data memory and includes a work area for a program, a save area for data when an error process is performed, and a loading area for a control program, each area used by the CPU 102. A read-only memory (ROM) 104 is a program memory and stores a program used for control by the CPU 102 including various processing described below. The program memory may be achieved by loading a program from an external storage device connected to the information processing apparatus 101 into the RAM 103. An atmospheric pressure sensor 105 is a device for detecting an amplitude of an atmospheric pressure applied to the information processing apparatus 101 and outputting an atmospheric pressure value. In the present exemplary embodiment, based on an atmospheric pressure value detected by the atmospheric pressure sensor 105, the height at which the information processing apparatus 101 is present is estimated. That is, the atmospheric pressure value is treated as information of height. In the present exemplary embodiment, however, if at least the atmospheric pressure sensor 105 is included, the sensor values of a plurality of sensors can also be comprehensively used to estimate the height by, for example, further including an acceleration sensor and detecting a change in the gravitational acceleration applied to the information processing apparatus 101. A GPS receiver 106 is a device for receiving a radio wave emitted from a GPS satellite, and based on GPS information, acquiring the latitude and the longitude of the current location where the information processing apparatus 101 is present. A storage device 107 is a hard disk drive for storing data and a program according to the present exemplary embodiment, or is an external storage device connected to the information processing apparatus 101 via an interface. The external storage device can be achieved by, for example, a medium (a recording medium) and an external storage drive for achieving access to the medium. As examples of such a medium, a flexible disk (FD), a Compact Disc Read-Only Memory (CD-ROM), a digital versatile disc (DVD), a Universal Serial Bus (USB) memory, a magneto-optical disk (MO), and a flash memory are known. Further, the external storage device may be a server apparatus connected to the information processing apparatus 101 via a network. A display unit 108 is, for example, a liquid crystal display and is a device for displaying execution screens of various applications and the processing result of the information processing apparatus 101 on a display area. Alternatively, the display unit 108 may be a touch panel display that functions both as a pointing device including a touch sensor for inputting operation information of an operation of the user on a touch target area, and as a display screen for outputting display to a display area. An azimuth sensor 109 is a geomagnetic sensor for, based on the detection of geomagnetism, detecting the azimuth in which the information processing apparatus 101 is directed relative to the absolute azimuth (north, south, east, and west), or detecting the azimuth in which the information processing apparatus 101 moves.

Figure 1B:
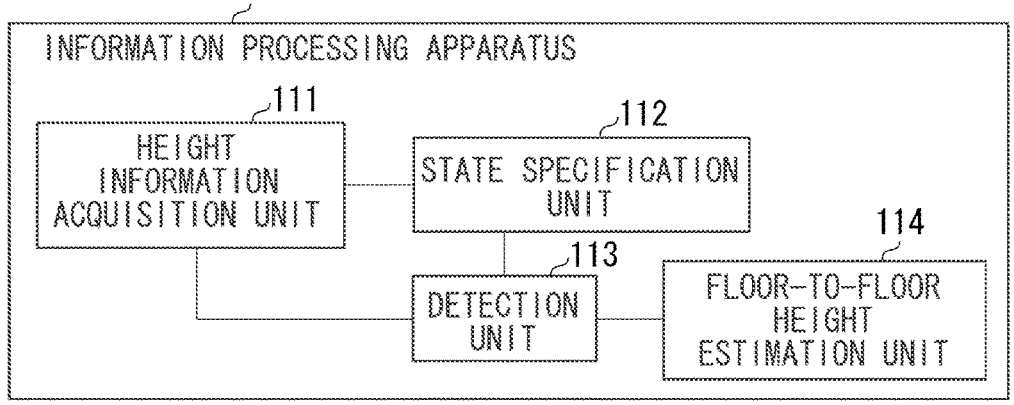

FIG. 1B is a block diagram illustrating a functional configuration of the information processing apparatus 101 according to the present exemplary embodiment. Each function unit is achieved by the CPU 102 loading a program stored in the ROM 104 into the RAM 103 and performing processing according to each flowchart described below. Further, for example, to configure hardware as an alternative for at least part of a software process using the CPU 102, a calculation unit and a circuit that correspond to the processing of each function unit described here may be configured.

Based on information indicating an amplitude of an atmospheric pressure notified by the atmospheric pressure sensor 105, a height information acquisition unit 111 acquires an atmospheric pressure value at the current position of the user (i.e., the current position of the information processing apparatus 101) and a change in the atmospheric pressure value. In the present exemplary embodiment, the atmospheric pressure value is treated as information corresponding to a height. However, a process of converting the atmospheric pressure value into a height may be added. The height information acquisition unit 111 stores in the RAM 103 the atmospheric pressure value acquired from the sensor and accumulates the change in the atmospheric pressure value as history.

Based on the history of the atmospheric pressure value accumulated by the height information acquisition unit 111, a state specification unit 112 specifies the state of the information processing apparatus 101 including at least a state where the information processing apparatus 101 starts moving up or down, and a state where the information processing apparatus 101 finishes moving up or down. Hereinafter, either moving up or down is referred to simply as "moving up and down". More specifically, the state specification unit 112 acquires, in the information accumulated in the RAM 103, the amount of change in atmospheric pressure and the horizontal moving distance during the period from a predetermined time ago to the current time (the most recent period). Then, the state specification unit 112 divides the acquired amount of change in atmospheric pressure by the acquired horizontal moving distance to calculate the slope of the change in atmospheric pressure. Then, the state specification unit 112 determines whether the absolute value of the calculated slope is equal to or greater than a threshold determined in advance. If it is determined that the calculated slope is equal to or greater than the threshold, it is indicated that the information processing apparatus 101 moves in the height direction, that is, the information processing apparatus 101 moves up and down. If the calculated slope is less than the threshold, it is indicated that the information processing apparatus 101 does not move in the height direction, that is, the information processing apparatus 101 does not move up and down. If, in the most recent period, a state where there is no moving up and down transitions to a state where there is moving up and down, and also if the moving up and down continues to be detected at the current time, the state specification unit 112 specifies a state where the information processing apparatus 101 starts moving up and down. If, in the most recent period, a state where there is moving up and down transitions to a state where there is no moving up and down, and also if there is no moving up and down at the current time, the state specification unit 112 specifies a state where the information processing apparatus 101 finishes moving up and down. Further, the following states may be specified in a distinguished manner. If there is moving up and down continuously in the most recent period, and also if the moving up and down continues to be detected at the current time, a state where the information processing apparatus 101 is in the middle of moving up and down may be specified. Further, if there has not been moving up and down continuously from the most recent period to the current time, a state where the information processing apparatus 101 is making a flat movement may be specified. In the present exemplary embodiment, however, it is only need to distinguish at least a state where the information processing apparatus 101 starts moving up and down as a first state, and a state where the information processing apparatus 101 finishes moving up and down as a second state.

At least based on the change in the atmospheric pressure value detected by the height information acquisition unit 111, a detection unit 113 detects that the information processing apparatus 101 performs moving up or down corresponding to one floor in a building having one or more floors. In the present exemplary embodiment, based on the change in the atmospheric pressure value stored in the RAM 103, the detection unit 113 detects, as moving up and down corresponding to one floor, the movement from a time point when the first state where the information processing apparatus 101 starts moving up and down is specified to a time point when the second state where the information processing apparatus 101 finishes moving up and down for the first time after the first state is specified. In the present exemplary embodiment, based on history information stored in the RAM 103, the detection unit 113 specifies the start time (a first time point when the first state is specified) and the end time (a second time point when the second state is specified) of the detected moving up and down corresponding to one floor and notifies a floor-to-floor height estimation unit 114 of the start time and the end time.

The floor-to-floor height estimation unit 114 acquires, in the information of the atmospheric pressure value stored in the RAM 103, the values acquired at the times specified by the detection unit 113 and calculates the floor-to-floor height from the difference between the acquired values. In the present exemplary embodiment, as an example, the floor-to-floor height is calculated using the following formula 1. In formula 1, H is the floor-to-floor height, $P_1$ is an atmospheric pressure value at a moving up/down starting point, $P_2$ is an atmospheric pressure value at a moving up/down finishing point, g is a gravitational acceleration, R is a gas constant, and T is the average temperature from the moving up/down starting point to the moving up/down finishing point.

[Math. 1]

$$H = -\frac{R\overline{T}}{g}\log\frac{P_2}{P_1} \quad \text{(Formula 1)}$$

The difference between the atmospheric pressure values can also be treated as it is as information corresponding to the height of the floor-to-floor height. The acquired information of the floor-to-floor height is stored in the RAM 103, or an external server or an application for performing processing using the floor-to-floor height is notified of the acquired information of the floor-to-floor height. Examples of the application for performing processing using the floor-to-floor height include an application for specifying the floor number of the floor on which the information processing apparatus 101 is present in a building having one or more floors, and providing navigation on this floor. Further, to store the determined floor-to-floor height information in a server, the floor-to-floor height estimation unit 114 communicates with the server via the Internet and transmits the floor-to-floor height information to the server.

The information corresponding to the height of the floor-to-floor height may be represented not by atmospheric pressure but by distance. Further, in addition to the information of the floor-to-floor height, information about the building may be stored in association with the floor-to-floor height information. Examples of the information about the building include the floor number of the floor on which the information processing apparatus 101 is present in the building, which is determined based on the floor-to-floor height, and the name of the building and position information of the building, which can be specified based on a GPS signal.

Figure 2:
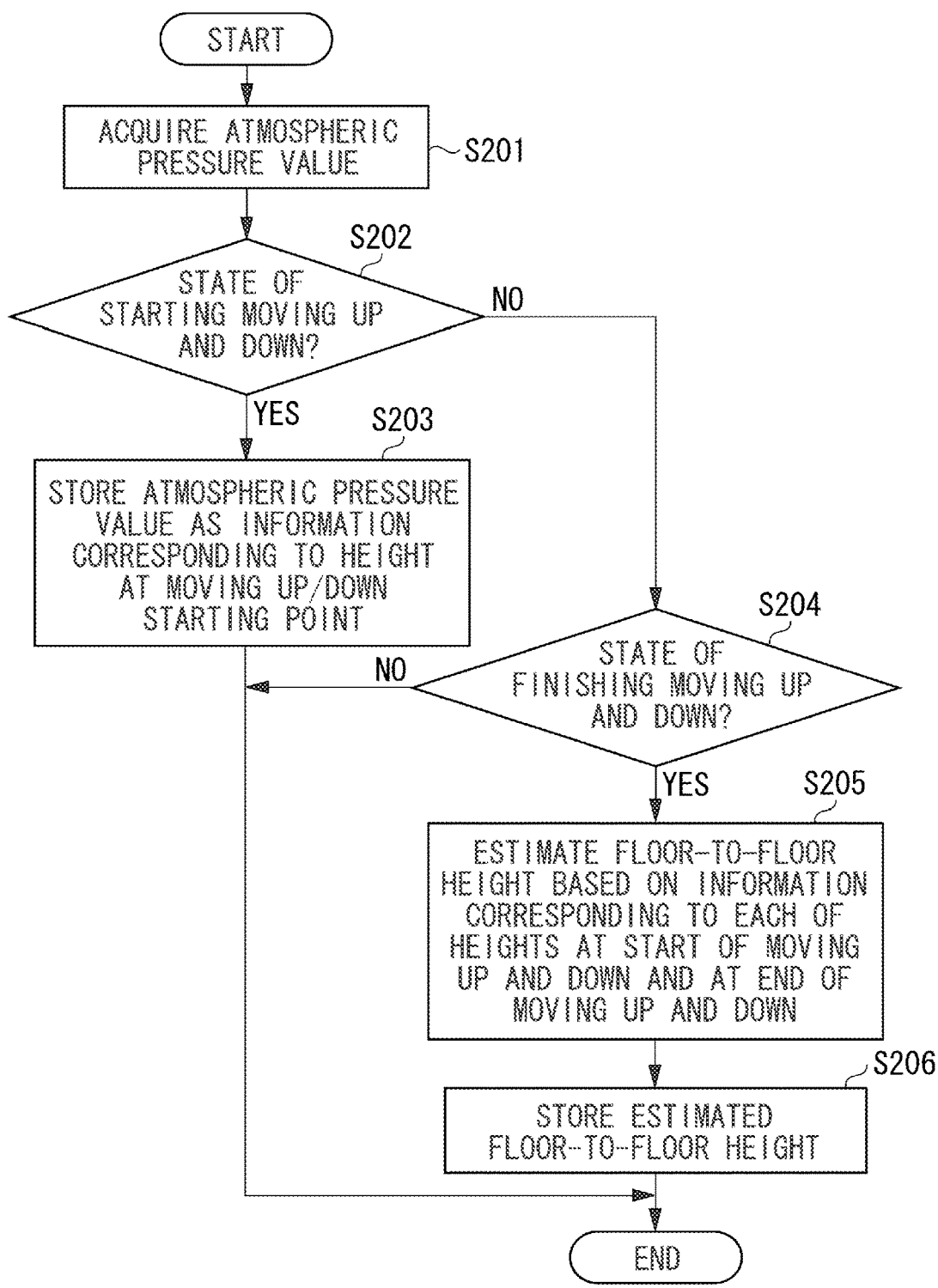
FIG. 2 is a flowchart illustrating floor-to-floor height estimation processing performed by the information processing apparatus.

FIG. 2 is a flowchart illustrating processing performed by the information processing apparatus 101 according to the present exemplary embodiment. In the present exemplary embodiment, the processing of this flowchart is started when the information processing apparatus 101 starts up. Then, the processing is repeated in a predetermined cycle until an instruction to end the processing is given. Alternatively, the processing of the flowchart in FIG. 2 may be started according to the fact that an application using a floor-to-floor height is started up, and a floor-to-floor height estimation function according to the present exemplary embodiment is called. Yet alternatively, the processing may be started when the entry of the information processing apparatus 101 into a building is detected based on a GPS signal, or when a script for calling the floor-to-floor height estimation function is called on a web browser.

In step S201, based on information notified by the atmospheric pressure sensor 105, the height information acquisition unit 111 acquires an atmospheric pressure value corresponding to the height at which the information processing apparatus 101 is present. Then, the height information acquisition unit 111 stores the acquired atmospheric pressure value in the RAM 103.

In step S202, the state specification unit 112 determines whether the current state of the information processing apparatus 101 is the first state where the information processing apparatus 101 starts moving up and down. If it is determined that the current state is the first state where the information processing apparatus 101 starts moving up and down (YES in step S202), the processing proceeds to step S203. If the current state is not the first state (NO in step S202), the processing proceeds to step S204.

In step S203, the state specification unit 112 acquires an atmospheric pressure value at the moving up/down starting point (an atmospheric pressure value detected last at the first time point when the first state is specified) and stores in the RAM 103 the acquired atmospheric pressure value as information corresponding to the height at the start of the moving up and down.

In step S204, the state specification unit 112 determines whether the current state of the information processing apparatus 101 is the second state where the information processing apparatus 101 finishes moving up and down. If it is determined that the current state is the second state where the information processing apparatus 101 finishes moving up and down (YES in step S204), the state specification unit 112 acquires an atmospheric pressure value at the end of the moving up and down, and the processing proceeds to step S205. If it is determined that the current state is not the second state (NO in step S204), the processing ends. Then, the processing is repeated from step S201 in the predetermined cycle.

In step S205, based on the atmospheric pressure value at the start of the moving up and down stored in step S203 and the atmospheric pressure value at the end of the moving up and down acquired in step S204, the floor-to-floor height estimation unit 114 calculates and estimates the floor-to-floor height of the building where the information processing apparatus 101 is present. In the present exemplary embodiment, the floor-to-floor height estimation unit 114 estimates the floor-to-floor height using the above formula 1. A process of determining whether the value calculated at this time is appropriate as a height corresponding to one floor of a building may be added. For example, it may be determined whether the value calculated as the floor-to-floor height is equal to or greater than 2.4 meters, which is a height corresponding to one floor. If the determination result is false, the processing may be canceled and then started again.

In step S206, the floor-to-floor height estimation unit 114 stores the calculated floor-to-floor height as floor-to-floor height information in the RAM 103. However, various processes for adapting the floor-to-floor height information to the use purpose, such as converting the floor-to-floor height information into information indicated in units of distance, may be added. In the above series of processes, the processing using the RAM 103 for the storing or the notification of information may be performed using a storage unit such as a hard disk drive (HDD) or an external server instead of the RAM 103.

Figure 3:
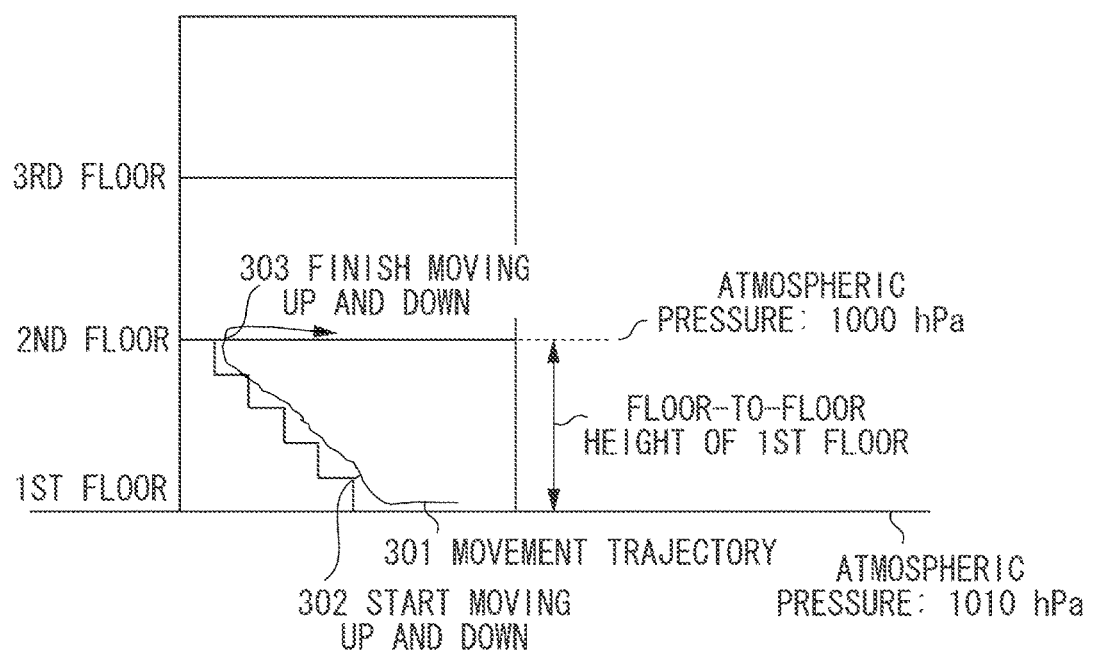
FIG. 3 is a schematic diagram illustrating an example of a state where a user carries the information processing apparatus.

FIG. 3 is a schematic diagram illustrating an exemplary action according to the present exemplary embodiment in a case where the information processing apparatus 101 is carried by the user moving up stairs from a first floor to a second floor. Although a case where the user goes upstairs is illustrated here as an example, the same also applies to a case where the user goes downstairs. Thus, the action of going upstairs will hereinafter be referred to simply as moving up and down. A trajectory 301 is the movement trajectory of the user carrying the information processing apparatus 101.

In step S202, in FIG. 3, at a position 302 at a time point when the user starts moving up, the state specification unit 112 determines that the moving up/down state of the information processing apparatus 101 is the first state where the information processing apparatus 101 starts moving up and down. It is assumed that an atmospheric pressure value acquired at this time point is 1010 hectopascals. As an atmospheric pressure value at the start of the moving up and down, 1010 hectopascals is stored in the RAM 103, and the processing once ends.

In step S204, at a time point 303 when the user finishes moving up and down, the state specification unit 112 determines that the moving up/down state of the information processing apparatus 101 is the second state where the information processing apparatus 101 finishes moving up and down. In step S205, the floor-to-floor height estimation unit 114 acquires an atmospheric pressure value of 1000 hectopascals at the moving up/down finishing point and an atmospheric pressure value of 1010 hectopascals at the moving up/down starting point and calculates the floor-to-floor height using the above formula 1. In step S206, the floor-to-floor height estimation unit 114 stores the calculated floor-to-floor height as floor-to-floor height information, and the processing ends.

In the present exemplary embodiment, when the floor-to-floor height is estimated once and information of the floor-to-floor height is stored, the processing may end. Alternatively, for example, based on a GPS signal, the processing may be repeated while the information processing apparatus 101 is present in the same building, and the obtained floor-to-floor heights may be averaged, thereby enabling the calculation of a more appropriate value. Yet alternatively, every time the processing is repeated, the floor-to-floor height obtained in the previous processing and the floor-to-floor height obtained in the current processing may be compared with each other. Then, in accordance with whether the difference between the floor-to-floor heights falls within a predetermined range, it may be determined whether to use the value obtained in the current processing for the calculation of the average. This can reduce the influence of an erroneously detected value.

In the present exemplary embodiment, information corresponding to the height at which the information processing apparatus 101 is present in a building is acquired, and based on a change in the information in the most recent period from a predetermined time ago to the current time, the start and the finish of moving up and down are detected. Then, the height of one floor of the building is estimated. If the length of the most recent period is set to be somewhat long, for example, a flat movement in which the information processing apparatus 101 moves on a staircase landing is not considered as the finish of moving up and down. Then, only after the user completes a movement from a certain floor to another floor, the movement can be considered as the finish of moving up and down. According to the present exemplary embodiment, it is possible to estimate a floor-to-floor height using only height information. Thus, the present exemplary embodiment is also applicable to a case where the azimuth sensor 109 is not included in the hardware configuration of the information processing apparatus 101.

In the present exemplary embodiment, information about height is acquired based on the detection result of the atmospheric pressure sensor 105. The present disclosure, however, is not limited to this. Alternatively, for example, information about height may be acquired based on a GPS signal acquired by the GPS receiver 106. In this case, a radio wave received from a GPS satellite includes information that allows an elevation to be calculated and obtained. Thus, it is possible to obtain the elevation of the current position.

Variation 1 of First Exemplary Embodiment

The first exemplary embodiment is based on the premise that if the user moves from a certain floor to another floor, this is a movement corresponding to one floor. The user, however, may move up and down a plurality of floors at a time according to the structure and the content of a building or the user's purpose. In response, in the present exemplary embodiment, in addition to a change in the information corresponding to height, further based on a change in the horizontal component of the movement of the user while moving up and down, moving up and down corresponding to one floor is detected. More specifically, when there is a great change in the movement component of the horizontal direction after the user starts moving up and down, it is considered that the user completes moving up and down corresponding to one floor. This processing uses a general tendency that if a person moves up and down a plurality of floors at a time using, for example, an escalator or stairs, the direction of the movement of the person often switches when the person finishes moving up and down one floor. However, in view of the possibility that the direction also switches before moving up and down corresponding to one floor is finished at, for example, a staircase landing, the process of determining whether the height of the estimated floor-to-floor height is included in an appropriate range is added.

Figure 1C:
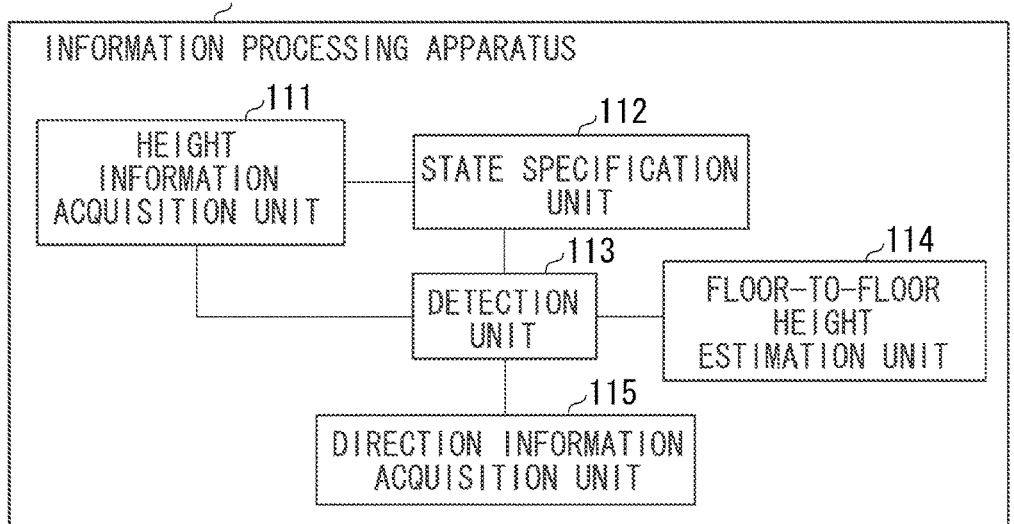

The hardware configuration of an information processing apparatus 101 according to variation 1 is similar to that in FIG. 1A described in the first exemplary embodiment, and therefore is not described in detail here. The variation 1 is also applicable to a terminal such as a general smartphone. The functional configuration of the information processing apparatus 101 according to the variation 1 is illustrated in FIG. 1C. The functional configuration of the information processing apparatus 101 according to the variation 1 is different from that according to the first exemplary embodiment in that a direction information acquisition unit 115 is added. Based on a signal notified by the azimuth sensor 109, the direction information acquisition unit 115 acquires information indicating the relative direction of the information processing apparatus 101 (the azimuth in which the information processing apparatus 101 is directed) with respect to the absolute azimuth based on north, south, east, and west. Further, the direction information acquisition unit 115 stores in the RAM 103 the acquired information indicating the direction. This information is accumulated, thereby enabling the information processing apparatus 101 to acquire the direction in which the information processing apparatus 101 moves. The moving direction, however, may be acquired not only from information obtained from the azimuth sensor 109, but also based on, for example, a movement trajectory indicated by GPS information. Alternatively, for example, the configuration may be such that an acceleration sensor is combined with at least one or more sensors such as a geomagnetic sensor and a gyro sensor.

Figure 4A:
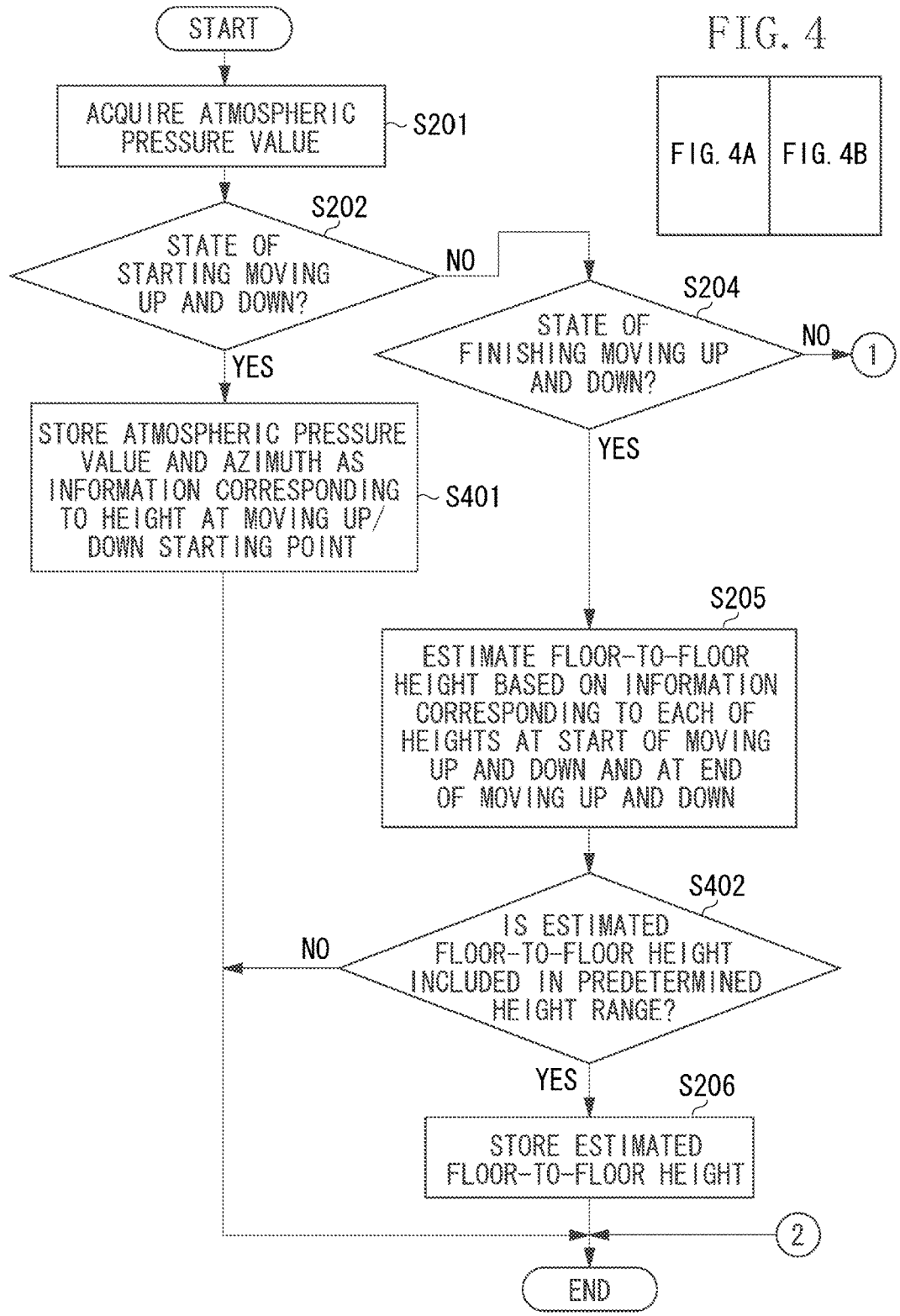
FIG. 4 (including FIGS. 4A and 4B) is a flowchart illustrating floor-to-floor height estimation processing performed by the information processing apparatus.

FIG. 4 (including FIGS. 4A and 4B) is a flowchart illustrating floor-to-floor height estimation processing performed by the information processing apparatus 101 according to the variation 1. Also in the variation 1, the processing of this flowchart is started when the information processing apparatus 101 starts up. Then, the processing is repeated in the predetermined cycle until an instruction to end the processing is given. Alternatively, the processing may be started according to the fact that a floor-to-floor height estimation function is called by an application. Processing steps similar to those of the flowchart in FIG. 2 are designated by the same numbers, and are not described in detail here.

In the flowchart in FIG. 4 (including FIGS. 4A and 4B), if it is determined in step S202 that the current state of the information processing apparatus 101 is the first state where the information processing apparatus 101 starts moving up and down (YES in step S202), the processing proceeds to step S401. In step S401, the height information acquisition unit 111 acquires an atmospheric pressure value at the moving up/down starting point, and the azimuth information acquisition unit 115 acquires, as the azimuth at the moving up/down starting point, direction information indicating the azimuth (hereinafter referred to simply as an "azimuth") detected by the azimuth sensor 109 at the start of the moving up and down (the first time point). Then, the atmospheric pressure value and the azimuth are stored in the RAM 103.

Further, in the variation 1, if the floor-to-floor height is estimated in step S205, then in step S402, the floor-to-floor height estimation unit 114 determines whether the estimated floor-to-floor height is included in a predetermined height range. The predetermined range is a range appropriate as a height corresponding to one floor of a building. For example, a range between 2.4 and 7 meters inclusive is set. This range, however, does not need to be set in meters. If the estimated floor-to-floor height is included in the predetermined height range (YES in step S402), the processing proceeds to step S206. In step S206, the estimated floor-to-floor height is stored. If, on the other hand, the estimated floor-to-floor height is not included in the predetermined height range (NO in step S402), it is considered that the information processing apparatus 101 is still in the middle of moving up and down, and the processing ends. In other words, in this case, the floor-to-floor height estimated in step S205 is not stored as the result of the estimation processing.

Further, in the variation 1, if it is determined in step S204 that the current state of the information processing apparatus 101 is not the second state where the information processing apparatus 101 finishes moving up and down (NO in step S204), the processing proceeds to step S403. In step S403, the state specification unit 112 determines whether the current state of the information processing apparatus 101 is a third state where the information processing apparatus 101 is in the middle of moving up and down. If it is determined that the information processing apparatus 101 is in the middle of moving up and down (YES in step S403), the processing proceeds to step S404. If the information processing apparatus 101 is not in the middle of moving up and down (NO in step S403), the processing immediately ends. A case where it is determined that the information processing apparatus 101 is not in the middle of moving up and down is, for example, a case where moving up and down does not occur in the first place.

In step S404, the azimuth information acquisition unit 115 acquires the current azimuth. Then, the detection unit 113 acquires the azimuth at the moving up/down starting point from the RAM 103 and calculates the difference between the acquired azimuth at the moving up/down starting point and the current azimuth. Then, the detection unit 113 determines whether the calculated difference is included in a predetermined angular range. In the specification, hereinafter, when an azimuth is exemplified, the azimuth is represented by a clockwise angle with respect to true north to simplify the value of the azimuth. The predetermined angular range is, for example, set as a range between 150 and 230 degrees inclusive. If the calculated difference is included in the predetermined angular range (YES in step S404), the processing proceeds to step S405. If the calculated difference is not included in the predetermined range (NO in step S404), the processing ends.

In step S405, the azimuth information acquisition unit 115 discards the azimuth at the moving up/down starting point stored in the RAM 103 and stores the current azimuth.

In step S406, the height information acquisition unit 111 acquires the current atmospheric pressure value. Then, based on the atmospheric pressure value at the moving up/down starting point stored in step S401 and the current atmospheric pressure value acquired in step S406, the floor-to-floor height estimation unit 114 calculates and estimates the floor-to-floor height of the building where the information processing apparatus 101 is present. In the present exemplary embodiment, the floor-to-floor height is estimated using the above formula 1.

The process of step S407 is similar to that of step S402. In other words, the detection unit 113 determines whether the estimated floor-to-floor height is included in the predetermined height range. If the estimated floor-to-floor height is included in the predetermined height range (YES in step S407), the processing proceeds to step S408. In step S408, the estimated floor-to-floor height is stored. If, on the other hand, the estimated floor-to-floor height is not included in the predetermined height range (NO in step S407), the processing ends. Also in this case, the floor-to-floor height estimated in step S406 is not stored as the result of the estimation processing. The above processing is repeated in the predetermined cycle.

FIG. 5A is a schematic diagram illustrating an exemplary action in a case where the user moving up stairs from a first floor to a third floor carries the information processing apparatus 101. A trajectory 501 is the movement trajectory of the user.

In FIG. 5A, at a point 502 where the user starts moving up and down, the state specification unit 112 determines that the current state of the information processing apparatus 101 is the state of starting moving up and down (step S202). Subsequently, the height information acquisition unit 111 acquires, as an atmospheric pressure value at the moving up/down starting point, an atmospheric pressure value of 1010 hectopascals at the start of the moving up and down, and the azimuth information acquisition unit 115 acquires, as the azimuth at the floor-to-floor height calculation point, an azimuth of 90 degrees at the start of the moving up and down. Then, the atmospheric pressure value and the azimuth are stored (step S401).

At a point 503 where the user continues moving up and down, the state specification unit 112 determines that the current state of the information processing apparatus 101 is the third state where the information processing apparatus 101 is in the middle of moving up and down (step S403). The detection unit 113 calculates a difference of 180 degrees between a current azimuth of 270 degrees acquired by the azimuth information acquisition unit 115, and the azimuth of 90 degrees at the moving up/down starting point stored in the RAM 103. If the predetermined angular range is between 150 and 230 degrees inclusive, it is determined that the calculated difference of 180 degrees is included in the predetermined range (YES in step S404). The value of the azimuth stored in the RAM 103 is discarded, and the current azimuth of 270 degrees is stored (step S405). The floor-to-floor height estimation unit 114 acquires a current atmospheric pressure value of 1000 hectopascals and estimates the floor-to-floor height using formula (1) based on the atmospheric pressure value of 1010 hectopascals at the moving up/down starting point stored in the RAM 103 (step S406). It is assumed that this value is equivalent to 4 meters, for example. If the predetermined height range is a range between 2.4 and 7 meters inclusive, the estimated floor-to-floor height of 4 meters is included in the predetermined height range. Thus, the estimated floor-to-floor height is stored (step S408). Then, the current atmospheric pressure value of 1000 hectopascals is stored as an atmospheric pressure value at the moving up/down starting point (step S409).

At a point 504 where the user finishes moving up and down, the state specification unit 112 determines that the current state of the information processing apparatus 101 is the second state where the information processing apparatus 101 finishes moving up and down (YES in step S204). The height information acquisition unit 111 acquires an atmospheric pressure value of 990 hectopascals at a time point when the user finishes moving up and down. The floor-to-floor height estimation unit 114 estimates the floor-to-floor height using formula 1 based on the atmospheric pressure value of 990 hectopascals at the time point when the user finishes moving up and down, and the atmospheric pressure value of 1000 hectopascals at the moving up/down starting point stored in the RAM 103 (step S205). The floor-to-floor height estimation unit 114 stores the estimated floor-to-floor height as floor-to-floor height information (step S206). The floor-to-floor height estimated at this time almost matches the floor-to-floor height of 4 meters that has already been estimated.

If the floor-to-floor height is thus estimated for a plurality of times in a single action of moving up and down, a new value may always be stored. Further, a plurality of floor-to-floor heights obtained while the information processing apparatus 101 is present in one building may be averaged, thereby enabling the calculation of a more appropriate value.

Then, this value may be stored as floor-to-floor height information. Alternatively, the floor-to-floor height obtained in the previous processing and the floor-to-floor height obtained in the current processing may be compared with each other. Then, in accordance with whether the difference between the floor-to-floor heights falls within a predetermined range, it may be determined whether to use the value obtained in the current processing for the calculation of the average. This can reduce the influence of an erroneously detected value.

FIG. 5B illustrates an exemplary action in a case where the user moving up stairs from a first floor to a second floor carries the information processing apparatus 101. Unlike the case in FIG. 3, however, FIG. 5B illustrates a case where the user passes through a landing. A trajectory 511 is the movement trajectory of the user. Processing redundant with that in the above exemplary action is not described below.

At a point 512 where the user starts moving up and down, the height information acquisition unit 111 acquires, as an atmospheric pressure value at the moving up/down starting point, an atmospheric pressure value of 1010 hectopascals at the start of the moving up and down, and the azimuth information acquisition unit 115 acquires, as the azimuth at the floor-to-floor height calculation point, an azimuth of 90 degrees at the start of the moving up and down (step S401).

At a point 513 where the user continues moving up and down and passes through a staircase landing, the detection unit 113 calculates the difference between a current azimuth of 270 degrees acquired by the azimuth information acquisition unit 115, and the azimuth of 90 degrees at the moving up/down starting point stored in the RAM 103. If the predetermined range is between 150 and 230 degrees inclusive, it is determined that the calculated azimuthal difference, which is 180 degrees, is included in the predetermined range (YES in step S404). The azimuth acquisition unit 115 discards the value of the azimuth at the floor-to-floor height calculation point stored in the RAM 103 and stores the current azimuth of 270 degrees (step S405). The floor-to-floor height estimation unit 114 estimates that the floor-to-floor height is 2 meters, based on a current atmospheric pressure value of 1005 hectopascals, the atmospheric pressure value of 1010 hectopascals at the moving up/down starting point, and formula 1. If the predetermined height range is between 2.4 and 7 meters inclusive, the floor-to-floor height estimation unit 114 discards information of the calculated floor-to-floor height of 2 meters, which is not included in the predetermined height range, and the processing ends (NO in step S407).

At a point 514 where the user finishes moving up and down, an atmospheric pressure value of 1000 hectopascals at a time point when the user finishes moving up and down is acquired. Then, the floor-to-floor height estimation unit 114 estimates a floor-to-floor height of 4 meters using the atmospheric pressure value of 1000 hectopascals at the time point when the user finishes moving up and down, the atmospheric pressure value of 1010 hectopascals at the moving up/down starting point stored in the RAM 103, and formula 1 (step S205). The estimated floor-to-floor height of 4 meters is included in the predetermined height range between 2.4 and 7 meters inclusive (YES in step S402). Thus, the floor-to-floor height of 4 meters is stored as floor-to-floor height information (step S206), and the processing ends.

According to the variation 1 of the first exemplary embodiment, also in a case where the user moves up and down a plurality of floors at a time in a building, moving up and down corresponding to one floor is detected based on a change in the moving direction of the user while moving up and down. Thus, it is possible to estimate a height corresponding to one floor. Further, it is determined whether the estimated height is appropriate as a floor-to-floor height. Thus, even if the moving direction changes at, for example, a staircase landing, erroneous detection is reduced. However, the process of comparing the height of the floor-to-floor height with the predetermined height range may be omitted according to the use environment. For example, if the building where the user and the information processing apparatus 101 are present can be specified based on GPS information, and if the structure of stairs can be specified and it is not necessary to take into account a landing, it is possible to obtain the effect of the present exemplary embodiment even by omitting the comparison process.

In the above example, in a case where a change in the moving direction of the user while moving up and down is included in a range between 150 and 230 degrees inclusive, it can be considered that moving up and down corresponding to one floor is completed. This is an example set based on a tendency that if a person moves up and down successive floors using an escalator or stairs, the direction of the person changes 180 degrees. However, there are also a building where a method for moving up and down successive floors changes its direction 90 degrees each time, and a building where an escalator is designed to intersect itself at a smaller angle. In these cases, an appropriate angular range may be set. For example, the configuration may be such that if the building where the information processing apparatus 101 is present can be specified based on GPS information, an angular range associated in advance with the building is acquired.

Variation 2 of First Exemplary Embodiment

Next, as variation 2, a description is given of a further variation in a case where moving up and down corresponding to one floor is detected taking into account a change in the moving direction. The variation 1 is based on the premise that the direction of stairs or an escalator is different on each floor. However, there is a case where a spiral staircase is placed in part of a building. If the information processing apparatus 101 moves up and down a spiral staircase at a constant speed, the azimuth detected in a predetermined cycle changes by a constant angle each time. Thus, if small amounts of angular change are accumulated, it is likely that the angular difference between the azimuth at certain timing at or after the start of the moving up and down and the azimuth at the start of the moving up and down is included in the predetermined range, regardless of whether moving up and down corresponding to one floor is completed. In response, in the variation 2, if the moving direction continuously changes by a constant angle each time during moving up and down, it is considered that a spiral staircase is used. Then, moving up and down corresponding to one floor is detected without taking into account a change in the moving direction. That is, if a spiral staircase is used, the floor-to-floor height is estimated by the method according to the first exemplary embodiment.

To perform processing in the variation 2, if it is determined in step S403 in the flowchart in FIG. 4 (including FIGS. 4A and 4B) that the information processing apparatus 101 is in the middle of moving up and down (YES in step S403), the following two processing steps may be added. First, the azimuth information acquisition unit 115 acquires azimuth information currently detected by the azimuth sensor 109 and stores the acquired azimuth information in the RAM 103. Then, the azimuth information acquisition unit 115 calculates the angular difference between the acquired azimuth information and the azimuth information detected most recently (at the end of the period immediately before the current time point) in already stored information. Further, the azimuth information acquisition unit 115 accumulates the calculated angular difference in the RAM 103. Next, the azimuth information acquisition unit 115 determines whether the acquired angular difference can be considered constant in a predetermined time in the past. For example, the azimuth information acquisition unit 115 determines whether an error falls within a predetermined minute range. If it is determined that the acquired angular difference can be considered constant in the predetermined time in the past, the processing ends. If, on the other hand, it is determined that the acquired angular difference cannot be considered constant, the processing proceeds to step S404. Then, the processing is performed as described above after that.

FIG. 6A is a schematic diagram illustrating an exemplary action in a case where the user moving up a spiral staircase from a first floor to a second floor carries the information processing apparatus 101. A trajectory 601 is the movement trajectory of the user. Further, FIG. 6B illustrates history information of the azimuth detected in this moving up and down. Processing similar to that in the above exemplary action is not described here.

It is assumed that in FIG. 6A, an atmospheric pressure value acquired at a point 602 where the user starts moving up and down is an atmospheric pressure value of 1010 hectopascals, and the azimuth is 90 degrees. These values are stored in the RAM 103. At a point 603 where the user continues moving up and down and immediately before and after the point 603, the angular difference (azimuthal difference) between the currently detected azimuth and the most recently detected azimuth is acquired every time the processing is repeated. FIG. 6B is an example of the history of the angular difference. In the example illustrated in FIG. 6A, it is assumed that the angular difference changes 30 degrees per second. Thus, it is determined that the acquired angular difference can be considered constant in the predetermined time in the past. Thus, the detection unit 113 does not detect moving up and down corresponding to one floor using a change in the moving direction. Thus, the floor-to-floor height is estimated based on an atmospheric pressure value of 1000 hectopascals acquired at a point 604 where the user finishes moving up and down, the atmospheric pressure value of 1010 hectopascals at the moving up/down starting point stored in the RAM 103, and formula 1.

According to the present variation, even if a spiral staircase is included in a method for moving up and down in a building, it is possible to perform both the process of detecting moving up and down corresponding to one floor taking into account a change in the moving direction, and the process of detecting moving up and down corresponding to one floor without taking into account a change in the moving direction. Also in the variation 2, for example, if the building where the information processing apparatus 101 is present can be specified based on GPS information, then according to the attribute of the building, it may be determined whether to perform the variation 2.

Variation 3 of First Exemplary Embodiment

As in the variations 1 and 2, if moving up and down corresponding to one floor is detected taking into account a change in the moving direction, there is a case where a change in the moving direction is detected also when the user and the information processing apparatus 101 change their direction while moving up and down (for example, make a U-turn and then move up and down in the opposite direction). In such a case, depending on the position where the direction is changed, a value included in the height range appropriate as a floor-to-floor height may be calculated in the floor-to-floor height estimation processing. Thus, in variation 3, at or after a time point when moving up and down is started, information indicating whether the current moving up and down is moving up or down is stored in the RAM 103. Then, if the direction of the moving up and down changes in the opposite direction before it is specified that the moving up and down is finished, the processing ends at the time of the change, and the floor-to-floor height estimation processing is not performed. Thus, for example, if the user and the information processing apparatus 101 make a U-turn and go back to the previous floor, the estimated floor-to-floor height is close to 0 meters, and is not considered appropriate. Thus, it is possible to reduce erroneous detection.

<Example of Use in Application>

A description is given here of an example where an application determines the floor number of the floor on which the information processing apparatus 101 is present in a building, using information of the floor-to-floor height estimated by the processing according to the first exemplary embodiment including the above variations. An example of the use of the present exemplary embodiment, however, is not limited to a form implemented as an application.

Figure 7A:
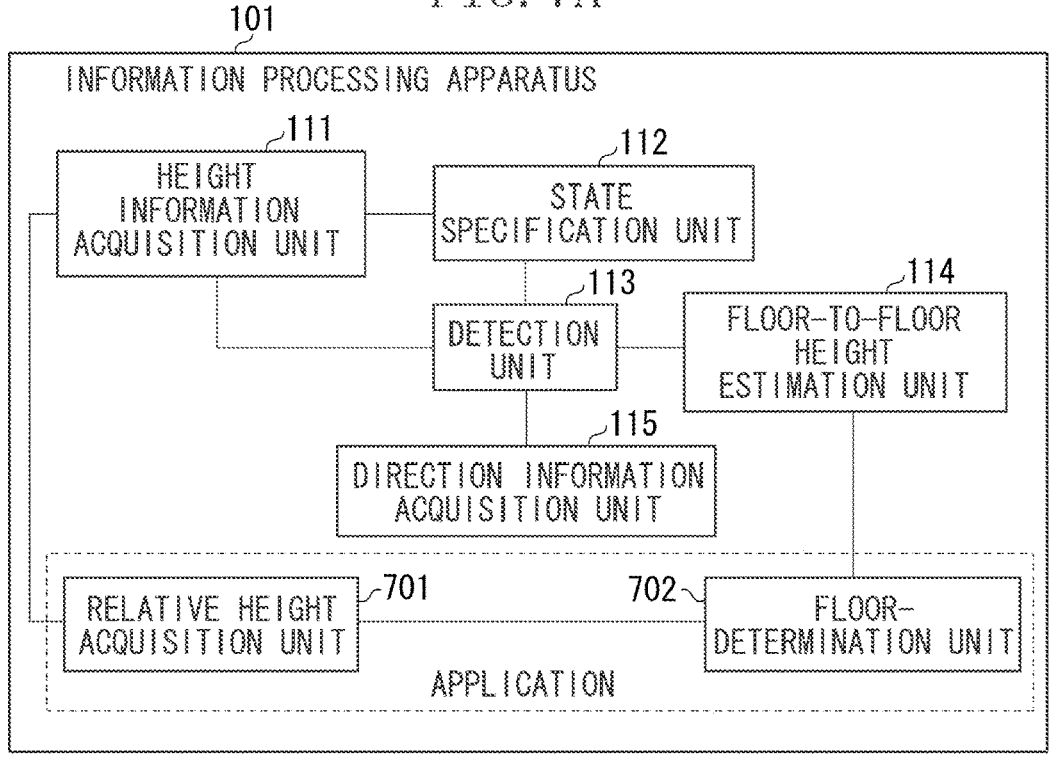
FIG. 7A is a diagram illustrating a functional configuration of the information processing apparatus.

FIG. 7A is a block diagram illustrating the functional configuration of the information processing apparatus 101, including an implemented application. The function units already described are not described here. Based on information acquired from the height information acquisition unit 111 and corresponding to the height at which the information processing apparatus 101 is present, and information about a building acquired from the storage device 107 or a network, the relative height between the height of a reference floor of the building and the height at which the information processing apparatus 101 is present is acquired. For example, the relative height is calculated using an atmospheric pressure value corresponding to a reference height, an atmospheric pressure value corresponding to the current height, and the above formula 1. In this case, H is the relative height from the reference height to the height at the current position, $P_1$ is an atmospheric pressure value at the reference height, $P_2$ is an atmospheric pressure value at the current position, g is a gravitational acceleration, R is a gas constant, and T is the average temperature from the reference height to the current position. The method for acquiring the relative height, however, is not limited to this. Alternatively, for example, the relative height may be acquired using an elevation acquired based on GPS information. Based on the relative height acquired by a relative height acquisition unit 701 and the height of the floor-to-floor height estimated by the floor-to-floor height estimation unit 114, a floor determination unit 702 determines the floor number of the floor on which the information processing apparatus 101 is present. The floor determination unit 702 may communicate with a server via the Internet and receive floor-to-floor height information from the server.

Figure 7B:
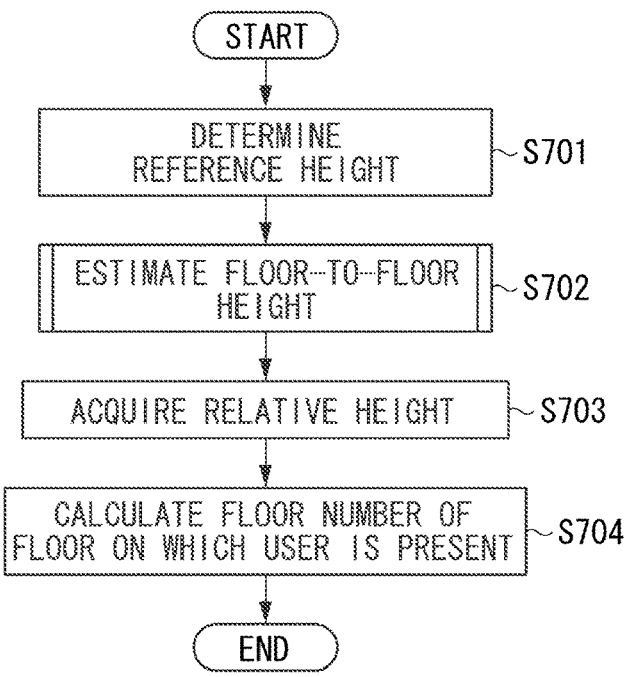
FIG. 7B is a flowchart illustrating floor number of floor determination processing.

FIG. 7B is a flowchart illustrating processing performed by the information processing apparatus 101 according to the first exemplary embodiment. In the present exemplary embodiment, when the execution of the application starts up, the processing of this flowchart is started.

In step S701, the relative height acquisition unit 701 determines, as reference height information, an atmospheric pressure value as a reference and stores the atmospheric pressure value in the RAM 103. The reference height is a height corresponding to one floor of a building (particularly, an indoor facility). For example, based on the state of acquisition of GPS information, the relative height acquisition unit 701 acquires an atmospheric pressure value acquired when the entry of the user into the building is detected, and an atmospheric pressure value set individually for the building. In step S702, the floor-to-floor height, which is a height corresponding to one floor of the building, is estimated by the processing described in the first exemplary embodiment and the variations of the first exemplary embodiment. In step S703, based on the difference between the atmospheric pressure value at the reference height and an atmospheric pressure value as height information of the position where the information processing apparatus 101 is currently present, the relative height acquisition unit 701 calculates and acquires the relative height. In step S704, based on the relative height calculated by the relative height acquisition unit 701 and floor-to-floor height information acquired from the RAM 103, the floor determination unit 702 calculates the floor number of the floor on which the user is present.

Figure 8:
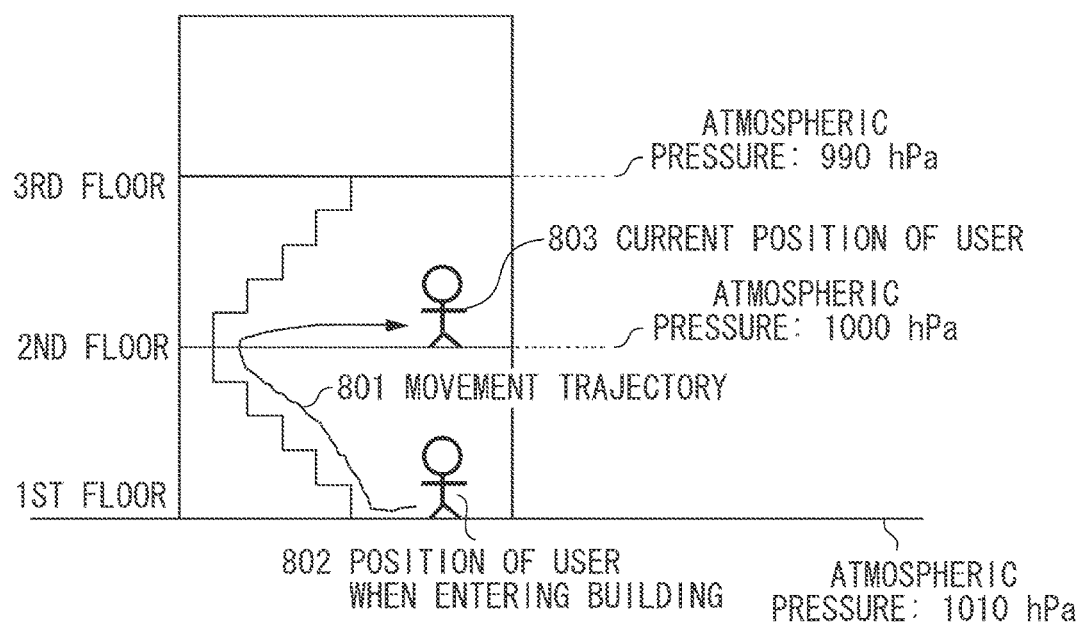
FIG. 8 is a schematic diagram illustrating an example of a state where the user carries the information processing apparatus.

FIG. 8 is a schematic diagram illustrating an exemplary action in a case where the user moving up stairs from a first floor to a second floor carries the information processing apparatus 101. A trajectory 801 is the movement trajectory of the user.

In step S701, at a time point 802 immediately after the user enters the building (a time point before the user starts moving up and down), an atmospheric pressure value of 1010 hectopascals is acquired. In the example illustrated in FIG. 8, this atmospheric pressure value, which indicates that the floor number of the floor is the first floor, is stored as reference height information in the RAM 103.

At a time point 803 after the user moves up and down from the first floor to the second floor, the floor-to-floor height is estimated. At this time, as an example, it is assumed that it is estimated that the floor-to-floor height is 4 meters as in the exemplary action in FIGS. 5A and 5B. Further, the relative height acquisition unit 701 acquires the reference height information from the RAM 103 and also acquires a current atmospheric pressure value of 1000 hectopascals. Then, based on the reference height information and the current atmospheric pressure value, the relative height acquisition unit 701 acquires the relative height. At this time, it is assumed that the calculated relative height is 5 meters (step S703). Based on the relative height of 5 meters calculated by the relative height calculation unit 701 and the floor-to-floor height of 4 meters acquired from the RAM 103, the floor determination unit 702 calculates the floor number of the floor on which the user is currently present, to be a second floor (step S704), and the processing ends.

One or more aspects or features of the present disclosure can also be achieved by the process of supplying a program for achieving one or more functions of the above exemplary embodiment to a system or an apparatus via a network or a storage medium, and causing one or more processors of a computer of the system or the apparatus to read and execute the program. Alternatively, one or more aspects or features of the present disclosure can also be achieved by a circuit (e.g., an application-specific integrated circuit (ASIC)) for achieving one or more functions.

It is possible to acquire information corresponding to the height of one floor of a building without storing information of the building in advance, or causing a user to give an explicit instruction.

Other Embodiments

Embodiments of the present disclosure can also be realized by a computer of a system or apparatus that reads out and executes computer executable instructions recorded on a storage medium (e.g., non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2014-249433, filed Dec. 9, 2014, which is hereby incorporated by reference herein in its entirety.

What is claimed is:

1. A portable apparatus that operates to determine a movement trajectory and a location of the apparatus, the apparatus comprising:
one or more processors that operate to:
acquire, using at least an atmospheric pressure sensor configured to cyclically detect an amplitude of atmospheric pressure applied to the apparatus, height information corresponding to a height at which the apparatus is present;
specify, in a case where an amount of change in the acquired height information, the height information being acquired during a period from a predetermined time ago to current time, is larger than a predetermined amount, that the apparatus is in a first state where the apparatus starts moving up or down, and in a case where the amount of change in the height information acquired during the period is smaller than the predetermined amount, that the apparatus is in a second state where the apparatus finishes moving up or down;
detect, in response to a transition of a state, from the first state to the second state, of the apparatus specified by the one or more processors, that the apparatus performs moving up or down corresponding to one floor in a building having one or more floors;
estimate, using the height information acquired by the one or more processors during the detected moving up or down corresponding to the one floor, a floor-to-floor height of the building having the one or more floors where the apparatus is present; and
determine the movement trajectory and the location of the apparatus in the building by one or more of the following:
(i) detecting a change in a movement direction of the apparatus; and
(ii) using the estimated floor-to-floor height of the building to confirm whether the apparatus is located on the one floor or on a floor different from the one floor in the building.

2. The apparatus according to claim 1, wherein the one or more processors specify a first time point when it is specified that the apparatus is in the first state, and a second time point when it is specified that the apparatus is in the second state for a first time after the first time point, and detect a movement from the first time point to the second time point as the moving up or down corresponding to the one floor, and
wherein the one or more processors estimate, as the floor-to-floor height, a difference between a height indicated by the height information acquired by the one or more processors at the first time point and a height indicated by the height information acquired by the one or more processors at the second time point.

3. The apparatus according to claim 2, wherein the one or more processors further operate to acquire direction information corresponding to the movement direction of the apparatus, the direction information including whether the change in the movement direction of the apparatus occurs, and
wherein the one or more processors specify the first time point when the apparatus starts moving up or down based on a change in the height information acquired by the one or more processors, and specify the second time point based on a change in the direction information acquired by the one or more processors at or after the first time point.

4. The apparatus according to claim 3, wherein, in a case where the difference between the height indicated by the height information acquired by the one or more processors at the first time point and the height indicated by the height information acquired by the one or more processors at the second time point is included in a predetermined height range, the one or more processors estimate the difference as the floor-to-floor height.

5. The apparatus according to claim 3, wherein, in a case where the movement direction continuously changes by a constant angle based on the direction information acquired by the one or more processors at or after the first time point, the one or more processors specify the second time point based on a change in the height information acquired by the one or more processors.

6. The apparatus according to claim 3, wherein, in a case where the height information acquired by the one or more processors at or after the first time point indicates that the apparatus moves up or down a spiral staircase, the one or more processors specify the second time point based on a change in the height information acquired by the one or more processors.

7. The apparatus according to claim 3, wherein the one or more processors acquire information indicating an absolute azimuth based on a value detected by a geomagnetic sensor.

8. The apparatus according to claim 2, wherein, in a case where the movement direction of the apparatus that started at the first time point is a direction of moving up or down of the apparatus and the movement direction of the apparatus at a current or present time do not match each other, the one or more processors do not detect the second time point.

9. The apparatus according to claim 1, wherein the one or more processors acquire information indicating the amplitude of atmospheric pressure detected by the atmospheric pressure sensor as the height information or acquire the height information by converting the information indicating the amplitude of atmospheric pressure into information indicating the height at which the apparatus is present.

10. The apparatus according to claim 1, wherein the one or more processors determine, based on the estimated floor-to-floor height of the building, the height information acquired by the one or more processors and corresponding to the height at which the apparatus is present, and height information corresponding to a reference height of the building, a floor number of a floor on which the apparatus is present in the building as information related to the movement trajectory and/or the location of the apparatus.

11. The apparatus according to claim 1, wherein one or more of the following:
    (i) the estimated floor-to-floor height is at least one of stored in a memory of the apparatus or an external server and outputted in a notification;
    (ii) the estimated floor-to-floor height is used to specify a floor number of a floor on which the apparatus is present in the building having the one or more floors, and the apparatus further operates to provide navigation on the floor using the determined movement trajectory and the determined location of the apparatus;
    (iii) the apparatus communicates with the external server via the Internet to transmit and store the estimated floor-to-floor height;
    (iv) the apparatus uses the determined trajectory for navigating up and down the floor;
    (v) the apparatus uses the estimated floor-to-floor height to determine whether the apparatus is in the first state or the second state;
    (vi) the estimated floor-to-floor height for each floor is compared to determine which floor-to-floor height to use to reduce an influence of an erroneously detected value of the estimated floor-to-floor heights; and
    (vii) the apparatus uses at least the atmospheric pressure sensor to obtain the estimated floor-to-floor height.

12. The apparatus according to claim 1, wherein one or more of the following:
    (i) the apparatus operates to be carried by a user and further operates to determine a movement trajectory and a location of the user carrying the apparatus;
    (ii) the apparatus uses the detection of the change of the movement direction of the apparatus to determine that the apparatus has finished moving to or from the one floor when the detected change is above a predetermined change threshold;
    (iii) the predetermined change threshold is a predetermined horizontal change threshold;
    (iv) in a case where the movement direction of the apparatus changes or switches, the apparatus determines that the apparatus and/or the user has finished moving to or from the one floor;
    (v) the apparatus further determines whether the estimated floor-to-floor height is accurate by evaluating whether the estimated floor-to-floor height is in a predetermined height range;
    (vi) the floor-to-floor height is calculated using the following equation:

$$H = -\frac{R\overline{T}}{g}\log\frac{P_2}{P_1},$$

wherein
H is the floor-to-floor height, P1 is an atmospheric pressure value at a moving up or down starting point, P2 is an atmospheric pressure value at a moving up or down finishing point, g is a gravitational acceleration, R is a gas constant, and T is an average temperature from the moving up or down starting point to the moving up or down finishing point;
    (vii) the apparatus determines whether the apparatus is in a third state where the apparatus is in the middle of moving up and down; and
    (viii) the apparatus further includes at least one additional sensor, which is used to help determine the movement trajectory and the location of the apparatus, the at least one additional sensor including one or more of the following: an acceleration sensor, a Global Positioning System (GPS) receiver, an azimuth sensor and a gyro sensor.

13. A method for controlling a portable apparatus that operates to determine a movement trajectory and a location of the apparatus, the method comprising:
    acquiring, using at least an atmospheric pressure sensor configured to cyclically detect an amplitude of atmospheric pressure applied to the apparatus, height information corresponding to a height at which the apparatus is present;
    specifying, in a case where an amount of change in the height information acquired during a period from a predetermined time ago to current time is larger than a predetermined amount, that the apparatus is in a first state where the apparatus starts moving up or down, and in a case where the amount of change in the height information acquired during the period is smaller than the predetermined amount, that the apparatus is in a second state where the apparatus finishes moving up or down;
    detecting, in response to a transition of the specified state, from the first state to the second state, of the apparatus, that the apparatus performs moving up or down corresponding to one floor in a building having one or more floors;
    estimating, using the acquired height information during the detected moving up or down corresponding to the one floor, a floor-to-floor height of the building having the one or more floors where the apparatus is present; and
    determining the movement trajectory and the location of the apparatus in the building by one or more of the following:
        (i) detecting a change in a movement direction of the apparatus; and
        (ii) using the estimated floor-to-floor height of the building to confirm whether the apparatus is located on the one floor or on a floor different from the one floor in the building.

14. The method according to claim 13, wherein one or more of the following:
    (i) the estimated floor-to-floor height is at least one of stored in a memory of the apparatus or an external server and outputted in a notification;
    (ii) the estimated floor-to-floor height is used to specify a floor number of a floor on which the apparatus is present in the building having the one or more floors, and the apparatus further operates to provide navigation on the floor using the determined movement trajectory and the determined location of the apparatus;

(iii) the apparatus communicates with the external server via the Internet to transmit and store the estimated floor-to-floor height;

(iv) the apparatus uses the determined trajectory for navigating up and down the floor;

(v) the apparatus uses the estimated floor-to-floor height to determine whether the apparatus is in the first state or the second state;

(vi) the estimated floor-to-floor height for each floor is compared to determine which floor-to-floor height to use to reduce an influence of an erroneously detected value of the estimated floor-to-floor heights; and (vii) the apparatus uses at least the atmospheric pressure sensor to obtain the estimated floor-to-floor height.

15. The method according to claim 13, wherein one or more of the following:

(i) the apparatus operates to be carried by a user and further operates to determine a movement trajectory and a location of the user carrying the apparatus;

(ii) the apparatus uses the detection of the change of the movement direction of the apparatus to determine that the apparatus has finished moving to or from the one floor when the detected change is above a predetermined change threshold;

(iii) the predetermined change threshold is a predetermined horizontal change threshold;

(iv) in a case where the movement direction of the apparatus changes or switches, the apparatus determines that the apparatus and/or the user has finished moving to or from the one floor;

(v) the apparatus further determines whether the estimated floor-to-floor height is accurate by evaluating whether the estimated floor-to-floor height is in a predetermined height range;

(vi) the floor-to-floor height is calculated using the following equation:

$$H = -\frac{RT}{g}\log\frac{P_2}{P_1},$$

wherein
H is the floor-to-floor height, P1 is an atmospheric pressure value at a moving up or down starting point, P2 is an atmospheric pressure value at a moving up or down finishing point, g is a gravitational acceleration, R is a gas constant, and T is an average temperature from the moving up or down starting point to the moving up or down finishing point;

(vii) the apparatus determines whether the apparatus is in a third state where the apparatus is in the middle of moving up and down; and (viii) the apparatus further includes at least one additional sensor, which is used to help determine the movement trajectory and the location of the apparatus, the at least one additional sensor including one or more of the following: an acceleration sensor, a Global Positioning System (GPS) receiver, an azimuth sensor and a gyro sensor.

16. A non-transitory computer-readable storage medium storing a program for causing a portable apparatus to perform a method for determining a movement trajectory and a location of the apparatus, the method comprising:

acquiring, using at least an atmospheric pressure sensor configured to cyclically detect an amplitude of atmospheric pressure applied to the apparatus, height information corresponding to a height at which the apparatus is present;

specifying, in a case where an amount of change in the height information acquired during a period from a predetermined time ago to current time is larger than a predetermined amount, at least that the apparatus is in a first state where the apparatus starts moving up or down, and in a case where the amount of change in the height information acquired during the period is smaller than the predetermined amount, that the apparatus is in a second state where the apparatus finishes moving up or down;

detecting, in response to a transition of the specified state, from the first state to the second state, of the apparatus, that the apparatus performs moving up or down corresponding to one floor in a building having one or more floors;

estimating, using the acquired height information during the detected moving up or down corresponding to the one floor, a floor-to-floor height of the building having the one or more floors where the apparatus is present; and determining the movement trajectory and the location of the apparatus in the building by one or more of the following:

(i) detecting a change in a movement direction of the apparatus; and (ii) using the estimated floor-to-floor height of the building to confirm whether the apparatus is located on the one floor or on a floor different from the one floor in the building.

17. The non-transitory computer-readable storage medium according to claim 16, wherein one or more of the following:

(i) the estimated floor-to-floor height is at least one of stored in a memory of the apparatus or an external server and outputted in a notification;

(ii) the estimated floor-to-floor height is used to specify a floor number of a floor on which the apparatus is present in the building having the one or more floors, and the apparatus further operates to provide navigation on the floor using the determined movement trajectory and the determined location of the apparatus;

(iii) the apparatus communicates with the external server via the Internet to transmit and store the estimated floor-to-floor height;

(iv) the apparatus uses the determined trajectory for navigating up and down the floor;

(v) the apparatus uses the estimated floor-to-floor height to determine whether the apparatus is in the first state or the second state;

(vi) the estimated floor-to-floor height for each floor is compared to determine which floor-to-floor height to use to reduce an influence of an erroneously detected value of the estimated floor-to-floor heights; and (vii) the apparatus uses at least the atmospheric pressure sensor to obtain the estimated floor-to-floor height.

18. The non-transitory computer-readable storage medium according to claim 16, wherein one or more of the following:

(i) the apparatus operates to be carried by a user and further operates to determine a movement trajectory and a location of the user carrying the apparatus;

(ii) the apparatus uses the detection of the change of the movement direction of the apparatus to determine that the apparatus has finished moving to or from the one floor when the detected change is above a predetermined change threshold;

(iii) the predetermined change threshold is a predetermined horizontal change threshold;

(iv) in a case where the movement direction of the apparatus changes or switches, the apparatus determines that the apparatus and/or the user has finished moving to or from the one floor;
(v) the apparatus further determines whether the estimated floor-to-floor height is accurate by evaluating whether the estimated floor-to-floor height is in a predetermined height range;
(vi) the floor-to-floor height is calculated using the following equation:

$$H = -\frac{R\overline{T}}{g} \log \frac{P_2}{P_1},$$

wherein
H is the floor-to-floor height, P1 is an atmospheric pressure value at a moving up or down starting point, P2 is an atmospheric pressure value at a moving up or down finishing point, g is a gravitational acceleration, R is a gas constant, and T is an average temperature from the moving up or down starting point to the moving up or down finishing point;
(vii) the apparatus determines whether the apparatus is in a third state where the apparatus is in the middle of moving up and down; and
(viii) the apparatus further includes at least one additional sensor, which is used to help determine the movement trajectory and the location of the apparatus, the at least one additional sensor including one or more of the following: an acceleration sensor, a Global Positioning System (GPS) receiver, an azimuth sensor and a gyro sensor.

* * * * *